(12) United States Patent
Barak (10) Patent No.: US 11,667,527 B2
(45) Date of Patent: Jun. 6, 2023

(54) PROCESS FOR PRODUCING A SOLUTION OF AMMONIUM CARBAMATE

(71) Applicant: A.Y. LABORATORIES LTD., Tel Aviv (IL)

(72) Inventor: Ayala Barak, Tel Aviv (IL)

(73) Assignee: A.Y. LABORATORIES LTD., Tel Aviv (IL)

( * ) Notice: Subject to any disclaimer, the term of this patent is extended or adjusted under 35 U.S.C. 154(b) by 0 days.

(21) Appl. No.: 17/619,851

(22) PCT Filed: Jun. 24, 2020

(86) PCT No.: PCT/IL2020/050701
§ 371 (c)(1),
(2) Date: Dec. 16, 2021

(87) PCT Pub. No.: WO2021/005588
PCT Pub. Date: Jan. 14, 2021

(65) Prior Publication Data
US 2022/0332580 A1 Oct. 20, 2022

Related U.S. Application Data

(60) Provisional application No. 62/871,412, filed on Jul. 8, 2019.

(51) Int. Cl.
*C01B 21/12* (2006.01)
(52) U.S. Cl.
CPC .................... *C01B 21/12* (2013.01)
(58) Field of Classification Search
CPC ................ C01B 21/12; A01N 59/00
See application file for complete search history.

(56) References Cited

U.S. PATENT DOCUMENTS

| | | | |
|---|---|---|---|
| 1,964,723 A * | 7/1934 | Cunningham | H01B 11/186 562/555 |
| 1,969,516 A | 8/1934 | Burns | |
| 6,914,157 B2 | 7/2005 | Lardinois | |
| 9,801,384 B2 | 10/2017 | Barak | |
| 10,315,986 B1 | 6/2019 | Coutinho et al. | |
| 2009/0069597 A1 | 3/2009 | Mennen et al. | |
| 2020/0398233 A1 | 12/2020 | Carey | |

FOREIGN PATENT DOCUMENTS

| | | |
|---|---|---|
| GB | 690134 | 4/1953 |
| SU | 1248954 | 8/1986 |
| WO | 2012/171070 | 12/2012 |
| WO | WO2012/171070 | * 12/2012 |
| WO | 2020/257694 | 12/2020 |
| WO | 2021/005588 | 1/2021 |

OTHER PUBLICATIONS

Mani, Fabrizio, Maurizio Peruzzini, and Piero Stoppioni. "CO 2 absorption by aqueous NH 3 solutions: speciation of ammonium carbamate, bicarbonate and carbonate by a 13 C NMR study." Green Chemistry 8.11 (2006): 995-1000. (Year: 2006).*
An Office Action dated Jul. 19, 2022, which issued during the prosecution of Israel Patent Application No. 287949. (Year: 2022).*
An Office Action dated Jul. 19, 2022, which issued during the prosecution of Israel Patent Application No. 287949.
Mani, Fabrizio, Maurizio Peruzzini, and Piero Stoppioni. "CO 2 absorption by aqueous NH 3 solutions: speciation of ammonium carbamate, bicarbonate and carbonate by a 13 C NMR study." Green Chemistry 8.11 (2006): 995-1000.
An Office Action dated Jun. 17, 2022, which issued during the prosecution of Australia Patent Application No. 2020309245.
An International Search Report and a Written Opinion both dated Sep. 4, 2020, which issued during the prosecution of Applicant's PCT/IL2020/050701.
An International Preliminary Report on Patentability dated Jan. 11, 2022, which issued during the prosecution of Applicant's PCT/IL2020/050701.
An Office Action dated Apr. 29, 2022, which issued during the prosecution of Indian Patent Application No. 202147057722.
U.S. Appl. No. 62/871,412, filed Jul. 8, 2019.
European Search Report dated Feb. 21, 2023, which issued during the prosecution of Applicant's European App No. 20836356.4.

* cited by examiner

*Primary Examiner* — Yevgeny Valenrod
*Assistant Examiner* — Blaine G Doletski
(74) *Attorney, Agent, or Firm* — Leason Ellis LLP (57) ABSTRACT

A method for producing a solution of ammonium carbamate is provided. The method comprises reacting ammonium hydroxide with sodium bicarbonate. The method avoids the complications of using carbon dioxide and can be carried out using standard equipment. The resulting solution of ammonium carbamate can be used to form a biocide by mixing with a hypochlorite oxidant.

20 Claims, 5 Drawing Sheets

PROCESS FOR PRODUCING A SOLUTION OF AMMONIUM CARBAMATE

CROSS-REFERENCE TO RELATED PATENT APPLICATIONS

This application is a U.S. National Stage Application under 35 U.S.C. § 371 of International Patent Application No. PCT/IL2020/050701 filed Jun. 24, 2020, which claims the benefit of U.S. Provisional Application No. 62/871,412 filed on Jul. 8, 2019, both of which are incorporated by reference in their entireties. The International Application was published on Jan. 14, 2021, as International Publication No. WO/2021/005588 A1.

FIELD OF THE INVENTION

The present invention relates to a process for producing a solution of ammonium carbamate.

BACKGROUND OF THE INVENTION

Various techniques are known for producing solid ammonium carbamate.

SUMMARY OF THE INVENTION

The present invention seeks to provide a method for producing a solution of ammonium carbamate.

There is thus provided in accordance with a preferred embodiment of the present invention a method for producing a solution of ammonium carbamate including: providing an aqueous solution of ammonium hydroxide; providing sodium bicarbonate; and mixing the solution of ammonium hydroxide with the sodium bicarbonate to produce the solution of ammonium carbamate. Preferably, the solution of ammonium hydroxide has a concentration of about 25-28% (as ammonia).

In accordance with one preferred embodiment of the present invention, the sodium bicarbonate is added as a solid to the solution of ammonium hydroxide. In accordance with an alternative preferred embodiment of the present invention, the solution of ammonium hydroxide is added to an aqueous slurry of the sodium bicarbonate. In one embodiment, the slurry further includes ammonium carbamate. Preferably, the weight ratio of the ammonium carbamate to the sodium bicarbonate prior to adding the ammonium hydroxide is from 1:10 to 1:1, more preferably from 1:2.5 to 1:1.5.

In a preferred embodiment, ammonium carbamate does not crystallize from the solution of ammonium carbamate when stored at 0° C. In another preferred embodiment, ammonium carbamate does not crystallize from the solution of ammonium carbamate when stored at −5° C. In a further preferred embodiment, ammonium carbamate does not crystallize from the solution of ammonium carbamate when stored at −10° C.

Preferably, the method further includes monitoring the conductivity of the solution of ammonium carbamate during the mixing. In a preferred embodiment, the method further includes monitoring the temperature of the solution of ammonium carbamate during the mixing. Preferably, the method further includes monitoring the pH of the solution of ammonium carbamate during the mixing.

In accordance with a preferred embodiment of the present invention, the concentration of the solution of ammonium carbamate at the end of the mixing is from about 15% to about 25%, preferably about 20%. Preferably, the pH of the solution of ammonium carbamate at the end of the mixing is at least 10.0, more preferably at least 10.4, and most preferably at least 10.68. In accordance with a preferred embodiment of the present invention, the conductivity of the solution of ammonium carbamate at the end of the mixing is between about 70 and about 130 mS/cm, more preferably between about 80 and about 120 mS/cm, and most preferably between about 90 and about 110 mS/cm.

Preferably, the method further includes producing a biocide by mixing the solution of ammonium carbamate with a solution of a hypochlorite oxidant. In accordance with a preferred embodiment of the present invention, the hypochlorite oxidant is sodium hypochlorite. Preferably, the solution of a hypochlorite oxidant has a concentration from about 1000 to about 20,000 ppm, more preferably from about 3000 to about 10,000 ppm, and most preferably from about 3500 to about 7000 ppm.

In accordance with a preferred embodiment of the present invention, the mixing the solution of ammonium carbamate with the solution of a hypochlorite oxidant includes: diluting the solution of ammonium carbamate with water or with a portion of the solution of a hypochlorite oxidant to form an ammonium carbamate dilution; and adding the remaining portion of the solution of a hypochlorite oxidant to the ammonium carbamate dilution. Preferably, the ammonium carbamate dilution has an ammonium carbamate concentration from about 1,000 to about 50,000 ppm, more preferably from about 12,000 to about 30,000 ppm. In accordance with a preferred embodiment of the present invention, the method further includes monitoring the conductivity of the biocide during the adding.

BRIEF DESCRIPTION OF THE DRAWING

The present invention will be understood and appreciated more fully from the following detailed description, taken in conjunction with the drawing in which.

DETAILED DESCRIPTION OF THE INVENTION

Production of ammonium carbamate has been carried out for many decades through the reaction of ammonia with carbon dioxide:

$$CO_2(g) + 2NH_3(g) \rightarrow NH_2COONH_4(s)$$

See for example Janecke, E. Z. Elektrochem. 1929, 35(9); and Janecke and Rahljs, Z. Elektrochem. 1932, 38(1). The interest in this system arose from the use of ammonium carbamate as a starting material for preparation of urea, and from the use of the reaction to capture emitted $CO_2$ in industrial processes. Much work has been dedicated to define the best conditions for producing a solid ammonium carbamate product that can be removed from the system and enable continuous capture of $CO_2$. See, for example, Sutter et al., Chemical Engineering Science 2015, 133:170-180.

Ammonium carbamate is also useful in the preparation of the biocide NAC by reaction with sodium hypochlorite. See U.S. Pat. Nos. 7,837,883 and 9,801,384, the contents of which are incorporated herein by reference in their entirety. In those publications, production of the biocide involves reaction of sodium hypochlorite with a solution of ammonium carbamate formed by dissolution of solid ammonium carbamate in an alkaline solution. In early 2019, there was a disruption in the production and supply of solid ammonium carbamate, the only form of ammonium carbamate available in commercial quantities. In order to continue production of the biocide, it was necessary to find a new way to produce ammonium carbamate.

Based on the vast available literature, the only method for producing ammonium carbamate would be reacting $CO_2$ (gas or liquid) with $NH_3$ (gas or liquid) in water. However, the use of $CO_2$ requires specific reaction and monitoring conditions which would require modifying the existing reactors used to make a solution from solid ammonium carbamate, and which would involve an unacceptable delay in production. Furthermore, since the end use of the ammonium carbamate is as a solution for on-site production of a biocide, it would be simpler to produce the ammonium carbamate as a solution, rather than as a solid product which would then need to be dissolved.

In accordance with a first embodiment of the present invention, there is provided a process for producing a solution of ammonium carbamate comprising reacting ammonium hydroxide (aqueous ammonia) with sodium bicarbonate. These two starting materials react according to the following reaction:

$$NaHCO_3(aq.\ slurry) + 2NH_4OH\ (aq) \rightarrow NH_2COONH_4\ (aq) + NaOH\ (aq) + 2H_2O \quad (1)$$

The reaction takes place in two steps, the first being an ion exchange step:

$$NaHCO_3(aq.\ slurry) + NH_4OH\ (aq) \rightarrow NH_4HCO_3(aq.\ slurry) + NaOH\ (aq) \quad (2)$$

$$NH_4HCO_3(aq) + NH_4OH\ (aq) \rightarrow NH_2COONH_4(aq) + 2H_2O \quad (3)$$

The use of sodium bicarbonate in place of carbon dioxide simplifies the reaction and allows carrying it out with standard equipment.

The sodium bicarbonate can be any commercially available sodium bicarbonate. Preferably, the sodium bicarbonate has a purity of at least 95%, preferably at least 98%, and more preferably at least 99%. The ammonium hydroxide can be any commercially available ammonium hydroxide (aqueous ammonia) solution. The concentration of the ammonium hydroxide solution can be from about 15 to about 30% (ammonia basis), preferably a solution having a concentration of about 25 to about 30% ammonia, most preferably a solution having a concentration of about 25 to about 28% ammonia. The water used to prepare the sodium bicarbonate slurry or dilute the ammonium hydroxide is preferably softened water having a level of calcium ions below the detection limit.

The reaction is preferably carried out such that the final concentration of the ammonium carbamate solution is from about 15 to about 25%, preferably about 20%, such as about 18%, about 19%, about 20%, about 21% or about 22% ammonium carbamate. The final pH of the ammonium carbamate solution is preferably at least 10.0, more preferably at least 10.4 and most preferably at least 10.68. The pH is preferably not more than 12.5, more preferably not more than 12.0 and most preferably not more than 11.5. The final conductivity of the ammonium carbamate solution is preferably about 70 to about 130 mS/cm, more preferably about 80 to about 120 mS/cm, and most preferably about 90 to about 110 mS/cm, such as about 98 to about 110 mS/cm.

The term "about" when preceding a numerical value throughout this specification refers to a range that is 10% more or less of the value.

The process may be carried out in one of two modes. In a first mode, solid sodium bicarbonate is added to a solution of ammonium hydroxide. Sodium bicarbonate is sparingly soluble in water, but when added to the solution of ammonium hydroxide reacts to form highly soluble ammonium carbamate. In a preferred embodiment, the sodium bicarbonate is added stepwise in portions in order to facilitate the reaction. Upon addition of a portion of sodium bicarbonate, the solution becomes turbid and upon completion of the reaction becomes clear again. This mode of reaction will be referred to herein as Method A.

In a second mode, a suspension of sodium bicarbonate in water is produced, and a solution of ammonium hydroxide in water is added to the suspension. In a preferred embodiment, the ammonium hydroxide solution is added dropwise to the suspension. As the reaction proceeds the white suspension turns clear as the sodium bicarbonate reacts to form ammonium bicarbonate which is also sparingly soluble and then soluble ammonium carbamate. This mode of reaction will be referred to herein as Method B. Both modes result in a clear solution identical to the solution previously formed by dissolving solid ammonium carbamate and used as a starting material for making the biocide NAC.

From Equation 1 above, it can be seen that sodium bicarbonate and ammonium hydroxide should be added in a 1:2 molar ratio. However, due to the tendency of the ammonium hydroxide solution to lose ammonia, its exact concentration is not known, and therefore it is desirable to control the reaction. In the prior art processes involving the reaction of carbon dioxide and ammonia, the effects of temperature and pressure on the reaction kinetics and equilibrium were studied.

It was found that for the present reaction between ammonium hydroxide and sodium bicarbonate, the reaction can be controlled by monitoring the conductivity during the reaction. In Method A, the conductivity gradually increases and becomes stable at the half-way point of the reaction. Furthermore, it can be seen that the reaction is complete when additional sodium bicarbonate is added and does not dissolve. In Method B, the conductivity reaches a maximum at the half-way point of the reaction. Furthermore, once the reaction solution is clear, all of the sodium bicarbonate has reacted. In Mode B, the temperature also gives an indication of the half-way point of the reaction. Reaction (2) above is exothermic while Reaction (3) is endothermic. Thus, when ammonium hydroxide is the limiting reactant, Reaction (2) takes place first causing the temperature to rise, and once Reaction (2) is complete Reaction (3) begins, causing the temperature to decrease.

It has been noted that crystallization of ammonium carbamate occurs in a 20% solution of ammonium carbamate at temperatures of 0° C. or lower. It is believed that the crystallization is increased by the presence of sodium ions in the solution, either from sodium hydroxide added to a solution prepared from solid ammonium carbamate or from sodium bicarbonate used in accordance with the present invention. The precipitated crystals re-dissolve when the solution temperature rises above 0° C.

In one embodiment of the present invention, a solution of ammonium carbamate is prepared according to Method B starting from a mixture of solid ammonium carbamate and solid sodium bicarbonate. A slurry of the mixture is formed and ammonium hydroxide is added thereto. The weight ratio of ammonium carbamate to sodium bicarbonate may be from 1:10 to 1:1, such as from 1:7 to 1:1.5, more particularly from 1:2.5 to 1:1.5.

The resulting solution of ammonium carbamate has a lower sodium content since less sodium bicarbonate was needed to achieve the same concentration of ammonium carbamate. As a result, the solution thus formed is stable at temperatures as low as 0° C., preferably temperatures as low as −3° C., as low as −5° C., as low as −7° C. or as low as −10° C. The final pH of the solution is the same as for the solution formed from a slurry of only sodium bicarbonate. The final conductivity of the solution is higher than that formed from a slurry of only sodium bicarbonate, typically in the range of 110 to about 130 mS/cm, more preferably about 115 to about 125 mS/cm The solution of ammonium carbamate produced by the method described herein can be used directly in the production of a biocide. The biocide is produced by reacting the ammonium carbamate solution with a solution of a hypochlorite oxidant. The hypochlorite oxidant can be any hypochlorite oxidant, such as the hypochlorite salt of an alkali metal or alkaline earth metal. Preferably, the hypochlorite salt is sodium hypochlorite, potassium hypochlorite or calcium hypochlorite. Most preferably, the hypochlorite salt is sodium hypochlorite.

The concentration of the hypochlorite oxidant solution is preferably from about 1000 to about 20,000 ppm. More preferably, the concentration of the hypochlorite solution is from about 3000 to about 10,000 ppm. Most preferably, the concentration of the hypochlorite solution is from about 3500 to about 7000 ppm, such as 5000 ppm.

To prepare a biocide, a portion of the ammonium carbamate solution is diluted with water or with the hypochlorite solution to form an ammonium carbamate dilution. The concentration of the ammonium carbamate in the ammonium carbamate dilution is preferably about 1,000 to about 50,000 ppm, more preferably, about 12,000 to about 30,000 ppm.

The solution of a hypochlorite oxidant is then mixed with the ammonium carbamate dilution. Preferably, the conductivity is monitored during the production of the biocide. The conductivity displays a local minimum during addition of portions of the hypochlorite oxidant solution followed by a local maximum. Preferably, the addition of hypochlorite oxidant is stopped when the local maximum is observed.

EXAMPLES

Figure 1:
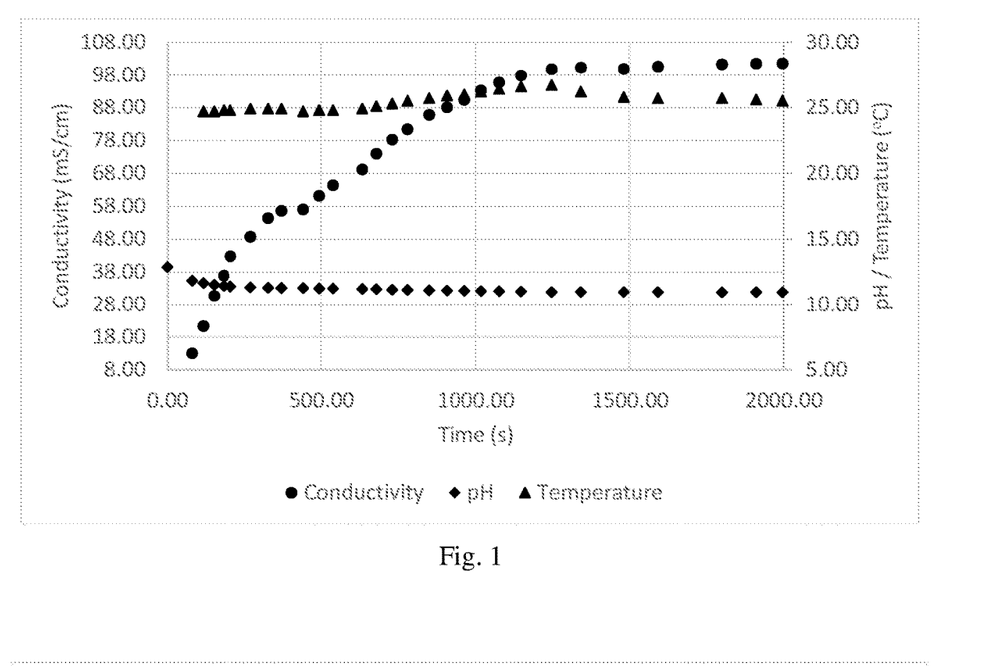
FIG. 1 is a graph showing the change in conductivity, pH and temperature during the production of ammonium carbamate in accordance with an embodiment of the present invention.

Example 1—Method A 76 ml of a 28% ammonium hydroxide solution (density 0.893 g/ml, Merck, analytically pure) were placed in a reaction vessel. 42 g sodium bicarbonate (Sigma, technical grade) were added in portions with a spoon. The conductivity, pH and temperature were measured throughout the reaction. The results are shown in FIG. 1. A clear solution was obtained having a concentration of about 20% ammonium carbamate. The final pH was 10.93, and the final conductivity was 101.5 mS/cm.

Example 2—Method B

Figure 2:
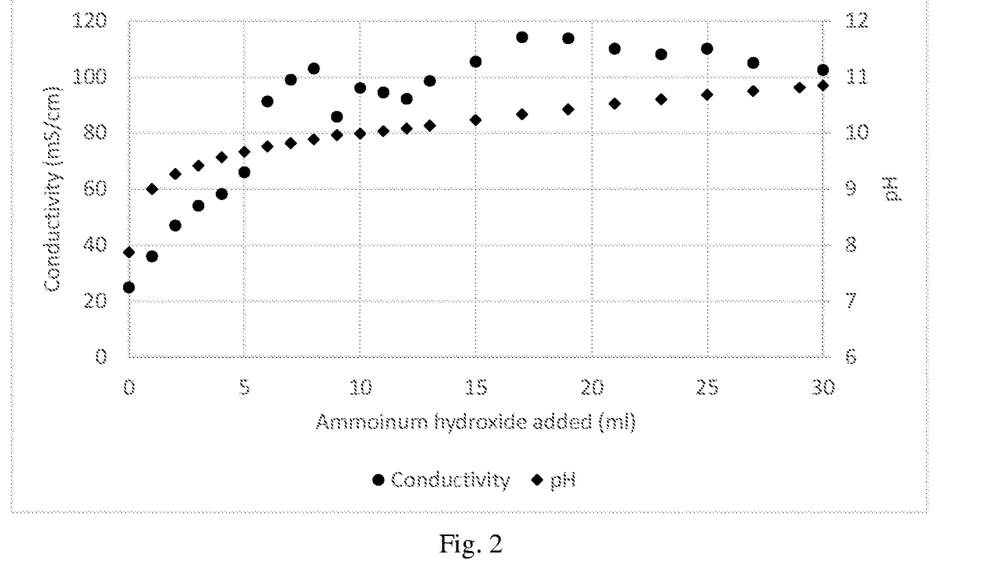
FIG. 2 is a graph showing the change in conductivity and pH during the production of ammonium carbamate in accordance with an embodiment of the present invention.

A slurry was formed by suspending 16 g sodium bicarbonate in 33.3 g water. A solution of ammonium hydroxide (28%, density 0.893 g/ml) was added dropwise. The conductivity and pH were measured after addition of every 1-2 ml. A total of 30 ml ammonium hydroxide were added, resulting in a clear solution. The results are shown in FIG. 2. At the end of the reaction, an additional 25 g water were added to produce a 20% solution of ammonium carbamate. The final pH was 10.61, and the final conductivity was 107.2 mS/cm.

Example 3—Method B

Figure 3:
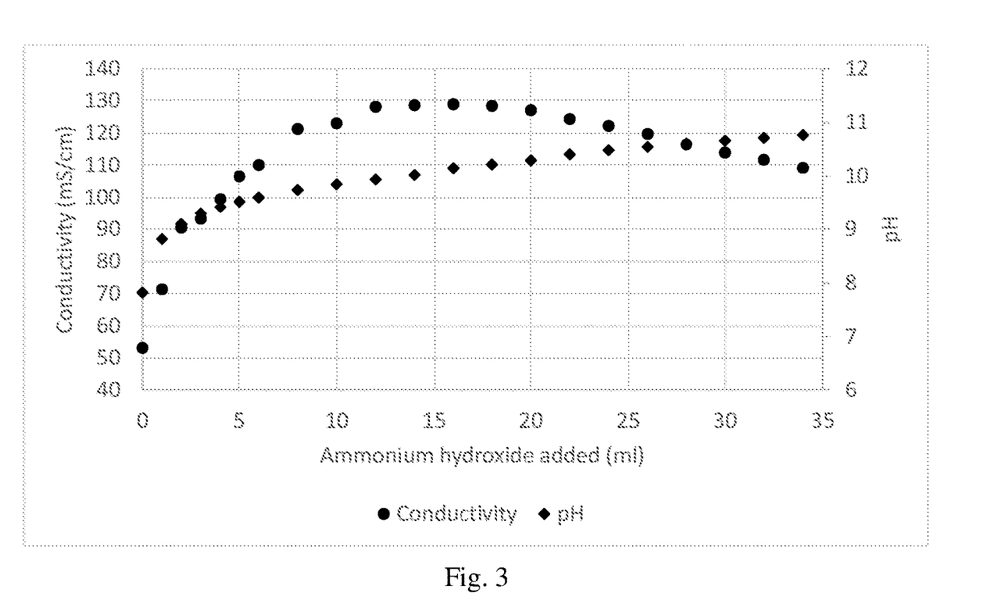
FIG. 3 is a graph showing the change in conductivity and pH during the production of ammonium carbamate in accordance with an embodiment of the present invention.

A slurry was formed by suspending 20 g sodium bicarbonate in 50.4 ml water. A solution of ammonium hydroxide (28%, density 0.893 g/ml) was added dropwise. The conductivity and pH were measured after addition of every 1-2 ml. A total of 34 ml ammonium hydroxide were added, resulting in a clear solution. The results are shown in FIG. 3. The final pH was 10.76, and the final conductivity was 109.2 mS/cm.

Example 4—Method B

Figure 4:
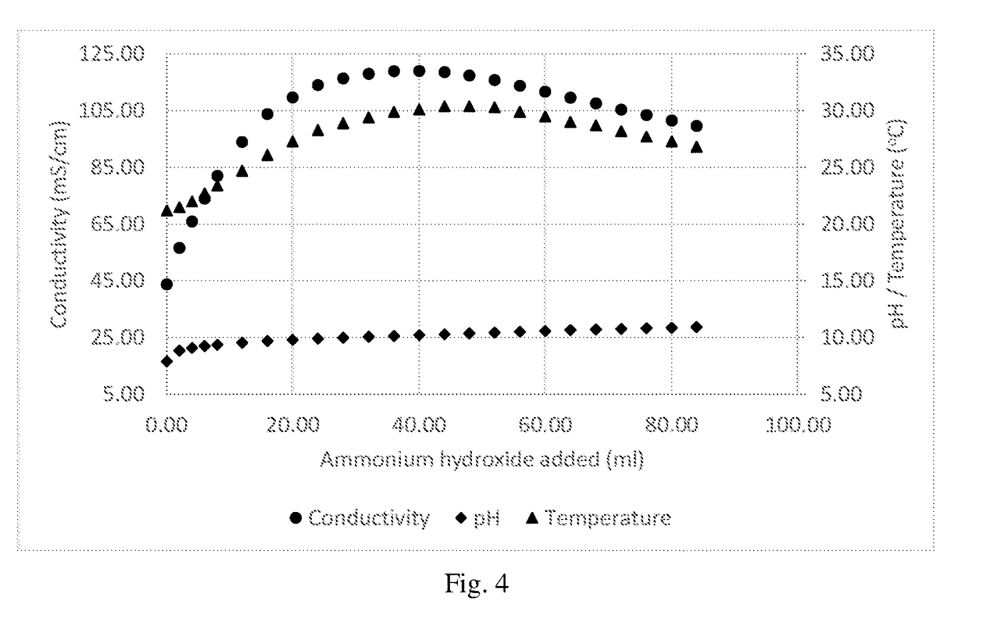
FIG. 4 is a graph showing the change in conductivity, pH and temperature during the production of ammonium carbamate in accordance with an embodiment of the present invention.

A slurry was formed by suspending 42 g sodium bicarbonate in 90 g water. A solution of ammonium hydroxide (28%, density 0.893 g/ml) was added dropwise. The conductivity, pH and temperature were measured after addition of every 2-4 ml. A total of 80 ml ammonium hydroxide were added, resulting in a clear solution. The results are shown in FIG. 4. The final pH was 10.89, and the final conductivity was 99.6 mS/cm.

Example 5—Method B, Pilot Scale

A slurry was formed by suspending 150 kg sodium bicarbonate (Sigma, food grade) in 212 kg water. A solution of ammonium hydroxide was added at about 6.5 L/min. The pH, temperature and conductivity were measured every minute. While the expected conductivity maximum indicating the half-way point should have occurred after addition of about 135 L ammonium hydroxide, this point was observed much later. Analysis of the ammonium hydroxide solution showed that the ammonia content was only about 15%. This is due to the tendency of ammonium hydroxide solutions to lose ammonia and highlights the need to control the reaction.

Figure 5:
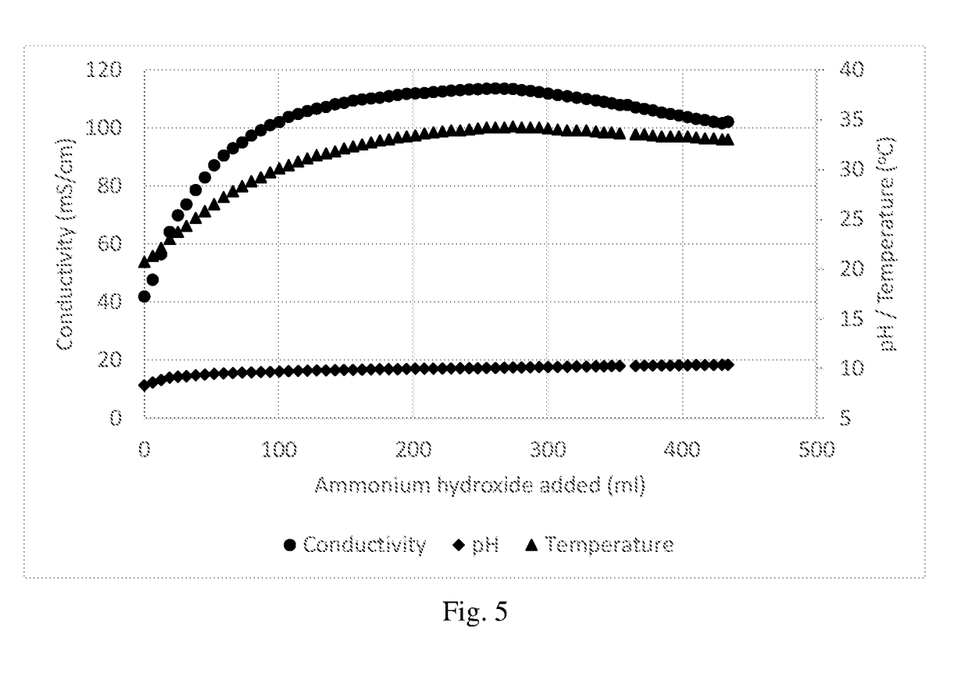
FIG. 5 is a graph showing the change in conductivity, pH and temperature during the production of ammonium carbamate in accordance with an embodiment of the present invention.

This also shows that any concentration of ammonium hydroxide can be used as long as the nominal concentration is known. A total of 434 L ammonium hydroxide were added, resulting in a clear solution. The results are shown in FIG. 5. The final pH was 10.36, and the final conductivity was 102.1 mS/cm.

Example 6—Method B, Pilot Scale

Figure 6:
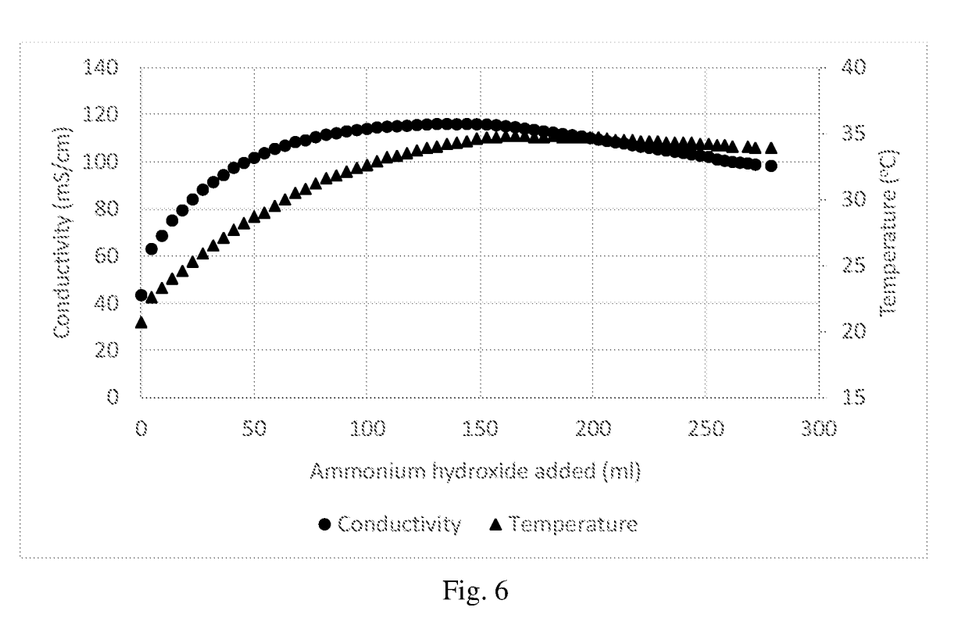
FIG. 6 is a graph showing the change in conductivity and temperature during the production of ammonium carbamate in accordance with an embodiment of the present invention.

A slurry was formed by suspending 150 kg sodium bicarbonate in 321 kg water. A solution of ammonium hydroxide (25%, density 0.9 g/ml) was added at about 4 L/min. The conductivity and temperature were measured every minute. A total of 279 L ammonium hydroxide were added, resulting in a clear solution. The results are shown in FIG. 6. The final conductivity was 98.3 mS/cm.

Example 7—Method B, Production of Biocide

Figure 7:
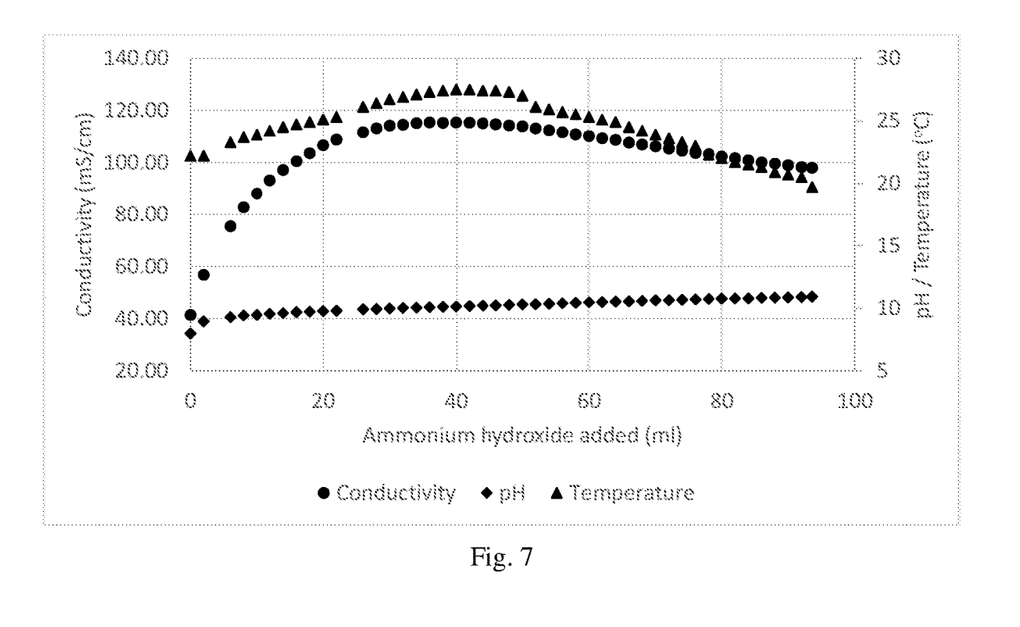
FIG. 7 is a graph showing the change in conductivity, pH and temperature during the production of ammonium carbamate in accordance with an embodiment of the present invention.

A slurry was formed by suspending 42 g sodium bicarbonate in 90 g water. A solution of ammonium hydroxide (25%, density 0.9 g/ml) was added dropwise. The conductivity, pH and temperature were measured after addition of every 2 ml. A total of 94 ml ammonium hydroxide were added, resulting in a clear solution. The results are shown in FIG. 7. The resulting solution had a concentration of approximately 19% ammonium carbamate. The final pH was 10.92, and the final conductivity was 98.0 mS/cm.

Figure 8:
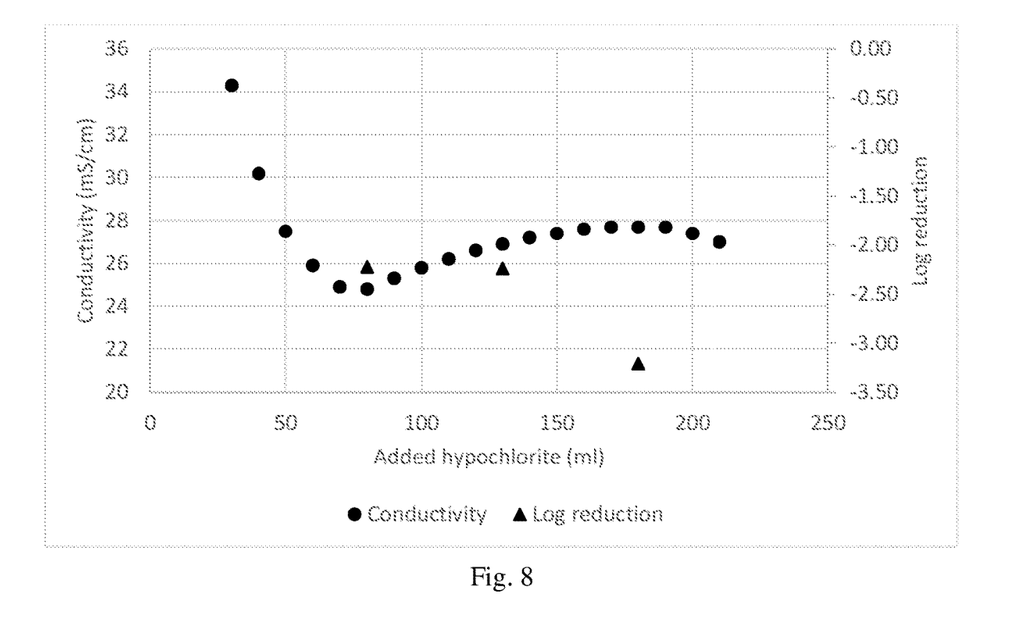
FIG. 8 is a graph showing the change in conductivity during the production of a biocide and the results of microorganism kill tests using the biocide.

A biocide was produced by diluting 2.6 ml of the ammonium carbamate solution produced above in 30 ml of a 5000 ppm sodium hypochlorite solution, and adding sodium hypochlorite in 10 ml portions. The conductivity was measured at each step. At several points, a sample of the biocide was taken and used at a concentration of 0.7 ppm in a kill test on $E.\ coli$. The results are shown in FIG. 8.

The conductivity shows a minimum value followed by a maximum. This is in line with what is described in co-owned U.S. Provisional Patent Application No. 62/869,273, filed Jul. 1, 2019, the contents of which are incorporated by reference herein in their entirety. Since at the beginning of the biocide preparation the ammonium salt is in excess, the biocide concentration is equal to the concentration of hypochlorite. As more hypochlorite is added, the amount of excess ammonium decreases. In each of the sets of tests, there is a constant biocide concentration while only the amount of excess ammonia changes. In all of the tests, as the amount of excess ammonia decreases the efficacy of the biocide increases without changing the biocide concentration. This shows, contrary to what was previously believed, that excess ammonia is deleterious to the biocidal activity.

Example 8—Method B, with Addition of Solid Ammonium Carbamate

Three solutions of ammonium carbamate were formed from a slurry of ammonium carbamate and sodium bicarbonate to which ammonium hydroxide (25-30%) was added dropwise (Samples 2, 3, and 4) until a clear solution was formed. A control formed by dissolving solid ammonium carbamate (Sample 1) and a control formed according to Method B above (Sample 5) were also prepared. The concentrations of the starting materials are set forth in Table 1.

TABLE 1

Starting materials for ammonium carbamate solutions

| Sample | Ammonium carbamate (g) | Sodium hydroxide 10% (g) | Sodium bicarbonate (g) | Ammonium hydroxide (ml) | Water (g) |
|---|---|---|---|---|---|
| 1 | 19.5 | 80.5 | | | |
| 2 | 2.39 | | 16.8 | 30.22 | 50.6 |
| 3 | 5.85 | | 14.7 | 26.44 | 53 |
| 4 | 7.8 | | 12.6 | 22.67 | 56.93 |
| 5 | | | 21 | 37.8 | 41.22 |

The final pH and conductivity of each solution was measured. The results are set forth in Table 2. Samples of each solution were placed in a circulating propylene glycol/water bath which was maintained at constant temperature for several days. Crystallization was visually noted, the results shown in Table 2. The crystallized samples were removed from the cold bath and placed at room temperature. The crystallized samples re-dissolved when heated to room temperature. These results show that addition of ammonium carbamate to the starting slurry results in a solution that is stable at a lower temperature than the solution formed only from sodium bicarbonate and ammonium hydroxide.

TABLE 2

| Sample | pH | Conductivity (mS/cm) | 0° C. | −5° C. | −10° C. |
|---|---|---|---|---|---|
| 1 | 10.61 | 91.6 | Crystallized | Crystallized | Crystallized |
| 2 | 10.48 | 116.4 | | Crystallized | Crystallized |
| 3 | 10.33 | 120.8 | | | Crystallized |
| 4 | 10.2 | 125.4 | | | |
| 5 | 10.73 | 108 | Crystallized | Crystallized | Crystallized |

Batch scale solutions were formed according to the ratios in Samples 3 and 4. The amounts of starting materials are given in Table 3. Crystallization tests were performed by placing the solutions in a rack outside the laboratory during the winter over the course of several weeks. The solutions were placed in the rack at the end of each work day and left overnight. In the morning, crystallization was visually noted, and the lowest measured temperature during the night was recorded. Samples that crystallized were re-dissolved at room temperature in the laboratory and returned to the outside rack at the end of the work day. The results are summarized in Table 4.

TABLE 3

Starting materials for ammonium carbamate batch scale solutions

| Batch | Ammonium carbamate (g) | Sodium bicarbonate (g) | Water (g) | Ammonium hydroxide (ml) | Batch weight (g) |
|---|---|---|---|---|---|
| 3 | 1000 | 2500 | 9062 | 4067.7 | 17094 |
| 4 | 1000 | 1500 | 7298 | 2616 | 12414 |
| 4A | 1000 | 2000 | 8414 | 3238 | 14652 |
| 4B | 1000 | 2000 | 10478 | 3238 | 17216 |
| 3A | 1000 | 2500 | 9485 | 4047 | 17032 |

TABLE 4

Outdoor crystallization results

| Sample | Highest temperature at which crystals were observed (° C.) |
| --- | --- |
| Sample 1 | −5.5 |
| Sample 2 | −5.2 |
| Sample 3 | −7.2 |
| Sample 4 | −8.7 |
| Sample 5 | −1.1 |
| Batch 3 | −3.1 |
| Batch 4 | <−8.7 (no crystals observed) |
| Batch 4A | <−8.7 (no crystals observed) |
| Batch 4B | <−8.7 (no crystals observed) |

The effects of uneven temperatures within the rack and the contribution of the shaking of the samples to crystallization were not considered. However, the general pattern showing the lowering of the crystallization temperature by addition of ammonium carbamate is demonstrated.

Example 9—Method B, Comparison

Figure 9:
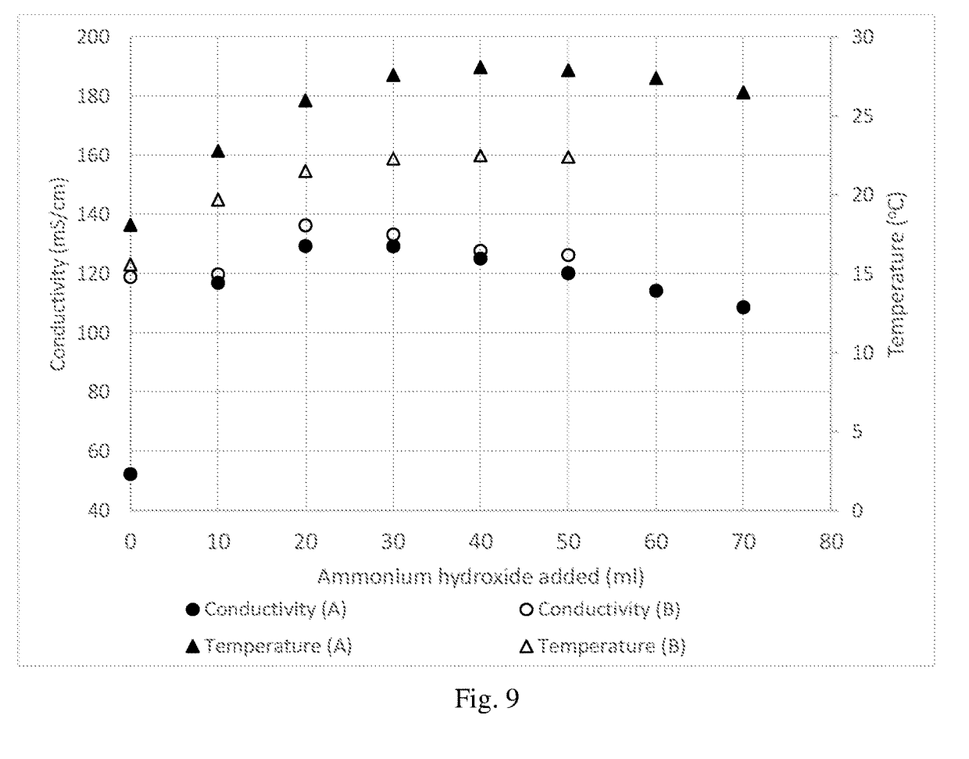
FIG. 9 is a graph showing the change in conductivity and temperature during the production of ammonium carbamate in accordance with embodiments of the present invention.

A slurry was prepared from 42 g sodium bicarbonate in 82.44 g water (slurry A), similar to Sample 5 in Example 8 above. A second slurry was prepared from 15.6 g ammonium carbamate and 25.2 g sodium bicarbonate in 113.86 g water (slurry B), similar to Sample 4 in Example 8 above. To each of the slurries, ammonium hydroxide (25-30%) was added until the solution was clear, and pH, conductivity and temperature were measured after each 10 ml of ammonium hydroxide addition. The pH measurements for the two slurries were substantially identical. The conductivity and temperature results are shown in FIG. 9. The conductivity of slurry B shows the same pattern as slurry A, having a maximum at the midpoint. The conductivity of the resulting solution (126.3 mS/cm) is slightly higher than that of the solution resulting from slurry A (108.7 mS/cm). The rise in temperature in the first half of the reaction is also observed in slurry B, although the temperature change is smaller since there is less sodium bicarbonate to react than in slurry A. This shows that the addition of ammonium carbamate to the starting slurry does not negatively affect the ability to monitor the reaction using conductivity and temperature.

It will be appreciated by persons skilled in the art that the present invention is not limited to what has been particularly shown and described hereinabove. Rather the scope of the present invention includes both combinations and subcombinations of various features described hereinabove as well as modifications thereof which would occur to a person of skill in the art upon reading the foregoing description and which are not in the prior art.

The invention claimed is:

1. A method for producing a solution of ammonium carbamate comprising:
   providing an aqueous solution of ammonium hydroxide;
   providing sodium bicarbonate; and
   mixing said solution of ammonium hydroxide with said sodium bicarbonate to produce said solution of ammonium carbamate;
   wherein the molar ratio of said ammonium hydroxide to said sodium bicarbonate is about 2:1.

2. The method according to claim 1, wherein said sodium bicarbonate is added as a solid to said solution of ammonium hydroxide.

3. A method for producing a solution of ammonium carbamate comprising:
   providing an aqueous solution of ammonium hydroxide;
   providing sodium bicarbonate; and
   mixing said solution of ammonium hydroxide with said sodium bicarbonate to produce said solution of ammonium carbamate;
   wherein said solution of ammonium hydroxide is added to an aqueous slurry of said sodium bicarbonate.

4. The method according to claim 3, wherein said slurry further comprises ammonium carbamate.

5. The method according to claim 4, wherein the weight ratio of said ammonium carbamate to said sodium bicarbonate prior to adding said ammonium hydroxide is from 1:10 to 1:1.

6. The method according to claim 4, wherein the weight ratio of said ammonium carbamate to said sodium bicarbonate prior to adding said ammonium hydroxide is from 1:2.5 to 1:1.5.

7. The method according to claim 4, wherein ammonium carbamate does not crystallize from said solution of ammonium carbamate when stored at 0° C.

8. The method according to claim 4, wherein ammonium carbamate does not crystallize from said solution of ammonium carbamate when stored at −5° C.

9. The method according to claim 4, wherein ammonium carbamate does not crystallize from said solution of ammonium carbamate when stored at −10° C.

10. The method according to claim 1, further comprising monitoring at least one of the conductivity, the temperature and the pH of said solution of ammonium carbamate during said mixing.

11. The method according to claim 1, wherein the concentration of said solution of ammonium carbamate at the end of said mixing is from about 15% to about 25%.

12. The method according to claim 1, wherein the pH of said solution of ammonium carbamate at the end of said mixing is at least 10.0.

13. The method according to claim 1, wherein the conductivity of said solution of ammonium carbamate at the end of said mixing is between about 70 and about 130 mS/cm.

14. A method for producing a solution of ammonium carbamate comprising:
   providing an aqueous solution of ammonium hydroxide;
   providing sodium bicarbonate; and
   mixing said solution of ammonium hydroxide with said sodium bicarbonate to produce said solution of ammonium carbamate;
   further comprising producing a biocide by mixing said solution of ammonium carbamate with a solution of a hypochlorite oxidant.

15. The method according to claim 14, wherein said hypochlorite oxidant is sodium hypochlorite.

16. The method according to claim 14, wherein said solution of a hypochlorite oxidant has a concentration from about 1000 to about 20,000 ppm.

17. The method according to claim 14, wherein said solution of a hypochlorite oxidant has a concentration from about 3000 to about 10,000 ppm.

18. The method according to claim 14, wherein said mixing said solution of ammonium carbamate with said solution of a hypochlorite oxidant comprises:
   diluting said solution of ammonium carbamate with water or with a portion of said solution of a hypochlorite oxidant to form an ammonium carbamate dilution; and
   adding a portion of said solution of a hypochlorite oxidant to said ammonium carbamate dilution.

19. The method according to claim 18, wherein said ammonium carbamate dilution has an ammonium carbamate concentration from about 1,000 to about 50,000 ppm.

20. The method according to claim 18, further comprising monitoring the conductivity of the biocide during said adding.

* * * * *